1

United States Patent
Lee et al.

(10) Patent No.: US 11,089,504 B2
(45) Date of Patent: Aug. 10, 2021

(54) APPARATUS AND METHOD FOR A USER EQUIPMENT (UE) OPERATING A SPLIT BEARER

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 88 days.

(21) Appl. No.: 16/498,350

(22) PCT Filed: May 15, 2018

(86) PCT No.: PCT/KR2018/005520
§ 371 (c)(1),
(2) Date: Sep. 26, 2019

(87) PCT Pub. No.: WO2018/212535
PCT Pub. Date: Nov. 22, 2018

(65) Prior Publication Data
US 2020/0107215 A1    Apr. 2, 2020

Related U.S. Application Data

(60) Provisional application No. 62/506,616, filed on May 16, 2017, provisional application No. 62/520,466, filed on Jun. 15, 2017.

(51) Int. Cl.
*H04W 28/02* (2009.01)
*H04L 12/707* (2013.01)
(Continued)

(52) U.S. Cl.
CPC ......... *H04W 28/0252* (2013.01); *H04L 45/24* (2013.01); *H04W 40/04* (2013.01); *H04W 72/0446* (2013.01); *H04W 80/08* (2013.01)

(58) Field of Classification Search
CPC . H04W 24/02; H04W 28/0252; H04W 40/04; H04W 72/0446; H04W 76/15; H04L 45/24
See application file for complete search history.

(56) References Cited

U.S. PATENT DOCUMENTS

2016/0088127 A1    3/2016  Cai
2016/0234714 A1*   8/2016  Basu Mallick ....... H04W 16/32
(Continued)

OTHER PUBLICATIONS

Samsung; "Data to be considered for BSR in uplink split bearer"; 3GPP TSG RAN WG2 #90 May 25 to 29, 2015, Fukuoka, Japan; R2-152263 (Year: 2015).*
(Continued)

*Primary Examiner* — Gary Mui
(74) *Attorney, Agent, or Firm* — Lee Hong Degerman Kang Waimey

(57) ABSTRACT

The method for a user equipment (UE) operating a split bearer in a wireless communication system according to an embodiment of the present application comprises steps of configuring a Packet Data Convergence Protocol (PDCP) entity and two Radio Link Control (RLC) entities associated with the split bearer; wherein a first RLC entity is configured as a first data path of the split bearer, wherein a second RLC entity is configured as a second data path of the split bearer, calculating an PDCP data increment rate; and determining a data path of the split bearer based on the PDCP data increment rate and a predefined threshold value.

13 Claims, 10 Drawing Sheets

(51) Int. Cl.
  *H04W 40/04* (2009.01)
  *H04W 72/04* (2009.01)
  *H04W 80/08* (2009.01)

(56) References Cited

U.S. PATENT DOCUMENTS

| | | | |
|---|---|---|---|
| 2016/0242193 A1* | 8/2016 | Hong | H04W 76/10 |
| 2016/0255551 A1 | 9/2016 | Susitaival et al. | |
| 2016/0286429 A1* | 9/2016 | Chen | H04W 28/0278 |
| 2016/0337909 A1* | 11/2016 | Cai | H04W 36/0033 |
| 2017/0006484 A1* | 1/2017 | Lee | H04W 28/08 |
| 2017/0013498 A1* | 1/2017 | Yl | H04L 43/16 |
| 2018/0206282 A1* | 7/2018 | Singh | H04W 88/06 |
| 2019/0069308 A1* | 2/2019 | Lee | H04W 72/10 |

OTHER PUBLICATIONS

PCT International Application No. PCT/KR2018/005520, Notification of Transmittal of the International Search Report and the Written Opinion of the International Searching Authority, or Declaration dated Aug. 23, 2018, 12 pages.

Ericsson, "UL Split in Dual Connectivity", 3GPP TSG RAN WG2 Meeting #97bis, R2-1702749, Apr. 2017, 5 pages.

Samsung, "Clarification on threshold based solution for UL split bearer", 3GPP TSG RAN WG2 Meeting #98, R2-1705817, May 2017, 4 pages.

Nokia, et al., "PDCP handling of UM split bearer", 3GPP TSG RAN WG2 Meeting #97bis, R2-1703559, Apr. 2017, 7 pages.

\* cited by examiner (a) Control-Plane Protocol Stack (b) User-Plane Protocol Stack

FIG. 6

| LCG ID | Buffer Size | Oct 1 |

FIG. 7

| Buffer Size #0 | Buffer Size #1 | Oct 1 |
| Buffer Size #1 | Buffer Size #2 | Oct 2 |
| Buffer Size #2 | Buffer Size #3 | Oct 3 |

APPARATUS AND METHOD FOR A USER EQUIPMENT (UE) OPERATING A SPLIT BEARER

CROSS-REFERENCE TO RELATED APPLICATIONS

This application is the National Stage filing under 35 U.S.C. 371 of International Application No. PCT/KR2018/005520, filed on May 15, 2018, which claims the benefit of U.S. Provisional Application No. 62/506,616, filed on May 16, 2017, and 62/520,466, filed on Jun. 15, 2017, the contents of which are all hereby incorporated by reference herein in their entirety.

TECHNICAL FIELD

The present invention relates to wireless communication, and more particularly, to apparatus and method for a user equipment (UE) operating a split bearer.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be referred to as eNB and gNode B (gNB), etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer (L1) of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer (L2) of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In the development to a New Radio Access Technology (NR), NR system should be able to use frequency bands up to 100 GHz. In NR, random access (RA) procedure may be an essential procedure for all UEs when establishing an RRC Connection or scheduling, increased latency. It is not desirable that random access preamble collision between UEs is not desirable. Therefore, a new method is required in supporting RA procedure with NR system.

DISCLOSURE

Technical Problem

An object of the present invention devised to solve the problem lies in method for a user equipment (UE) operating a split bearer in a wireless communication system Another object of the present invention is to provide a user equipment (UE) for operating a split bearer in a wireless communication system.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for a user equipment (UE) operating a split bearer in a wireless communication system comprises configuring a Packet Data Convergence Protocol (PDCP) entity and two Radio Link Control (RLC) entities associated with the split bearer; wherein a first RLC entity is configured as a first data path of the split bearer, wherein a second RLC entity is configured as a second data path of the split bearer, calculating an PDCP data increment rate; and determining a data path of the split bearer based on the PDCP data increment rate and a predefined threshold value.

The method further comprises, if the PDCP data increment rate is equal to or larger than the predefined threshold value, transmitting PDCP SDUs to a RLC entity associated with any data path of the split bearer based on the determining. The method further comprises indicating an amount of PDCP SDUs received from an upper layer for a given period of time to both a first MAC entity and a second MAC entity associated with the first data path and the second data path of the split bearer.

The method further comprises, if the PDCP data increment rate is less than the predefined threshold value, transmitting PDCP SDUs to a RLC entity associated with a specific data path of the split bearer based on the determining. The method further comprises indicating an amount of PDCP SDUs received from an upper layer for a given period of time to a specific MAC entity associated with the specific data path of the split bearer.

The PDCP data increment rate is calculated as an amount of PDCP SDUs received from an upper layer for a given period of time. The PDCP data increment rate is calculated as a number of PDCP SDUs received from an upper layer for a given period of time. The length of the given period of time (or the given period of time) is configured for the UE, the given period of time corresponds a duration between a second time point which the PDCP entity submits the PDU SDUs to a lower layer and a first time point before by the length of the given period of time from the second time point.

In another aspect of the present invention, provided herein is a user equipment (UE) operating a split bearer in a wireless communication system comprises a processor, the processor is configured to configure a Packet Data Convergence Protocol (PDCP) entity and two Radio Link Control (RLC) entities associated with the split bearer; wherein a first RLC entity is configured as a first data path of the split bearer, wherein a second RLC entity is configured as a second data path of the split bearer, the processor is configured to calculate an PDCP data increment rate and determine a data path of the split bearer based on the PDCP data increment rate and a predefined threshold value.

The UE further comprises a transmitter configured to transmit PDCP SDUs to a RLC entity associated with any data path of the split bearer based on the determining if the PDCP data increment rate is equal to or larger than the predefined threshold value. The processor is configured to indicate an amount of PDCP SDUs received from an upper layer for a given period of time to both a first MAC entity and a second MAC entity associated with the first data path and the second data path of the split bearer.

The UE further comprises a transmitter configured to transmit PDCP SDUs to a RLC entity associated with a specific data path of the split bearer based on the determining if the PDCP data increment rate is less than the predefined threshold value. The processor is configured to indicate an amount of PDCP SDUs received from an upper layer for a given period of time to a specific MAC entity associated with the specific data path of the split bearer.

The processor is configured to calculate PDCP data increment rate as an amount of PDCP SDUs received from an upper layer for a given period of time. The processor is configured to calculate the PDCP data increment rate as a number of PDCP SDUs received from an upper layer for a given period of time.

Advantageous Effects

An example of embodiment according to the present invention allows to use both paths of split bearer in pre-processing by a new threshold based approach so that communication performance is enhanced.

It will be appreciated by those skilled in the art that the effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 6 is a diagram illustrating a short BSR and Truncated BSR MAC control element, FIG. 7 is a diagram illustrating a long BSR and Truncated BSR MAC control element.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

Dual Connectivity (DC)

Figure 1:
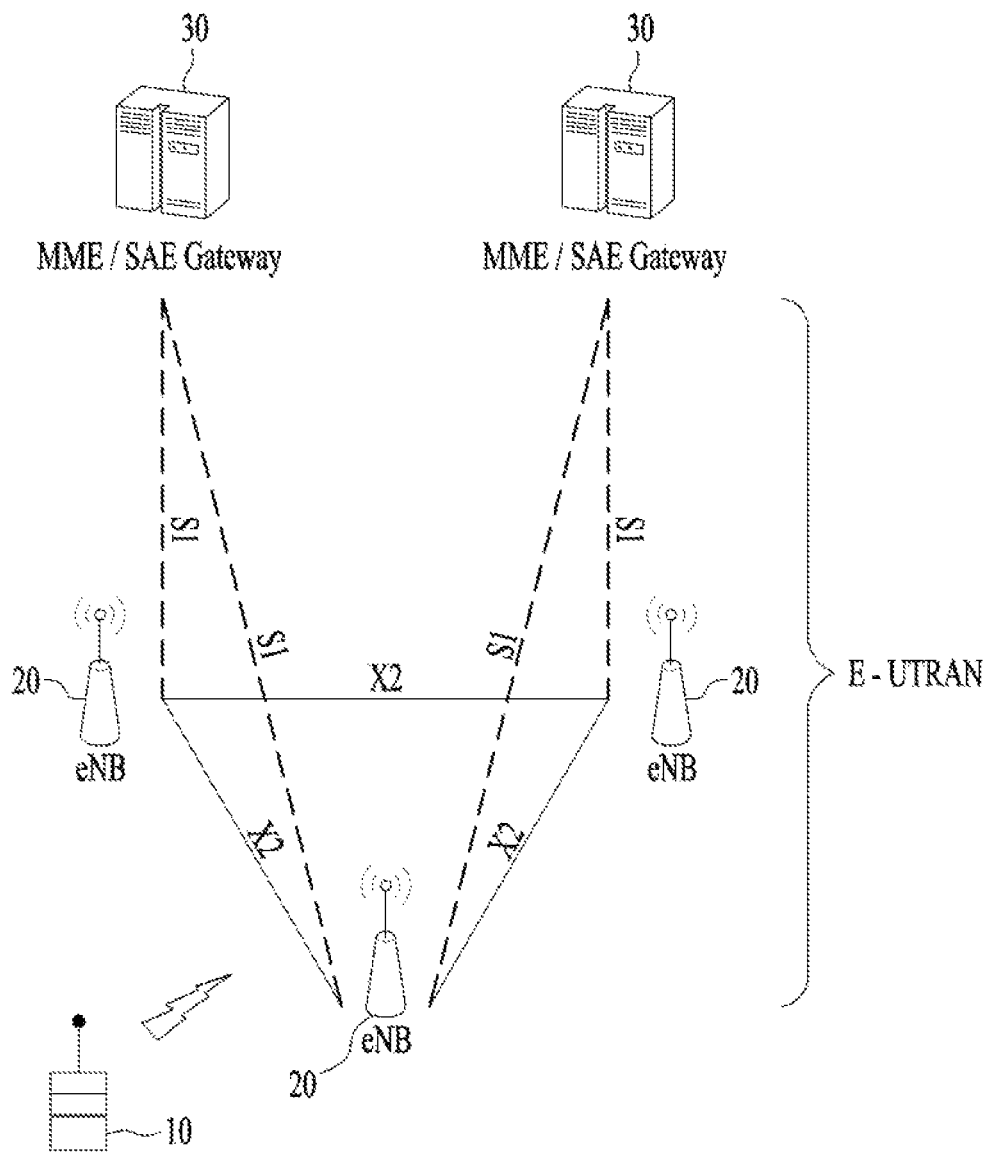
FIG. 1 is a block diagram illustrating network structure of an evolved universal mobile telecommunication system (E-UMTS).
Figure 2:
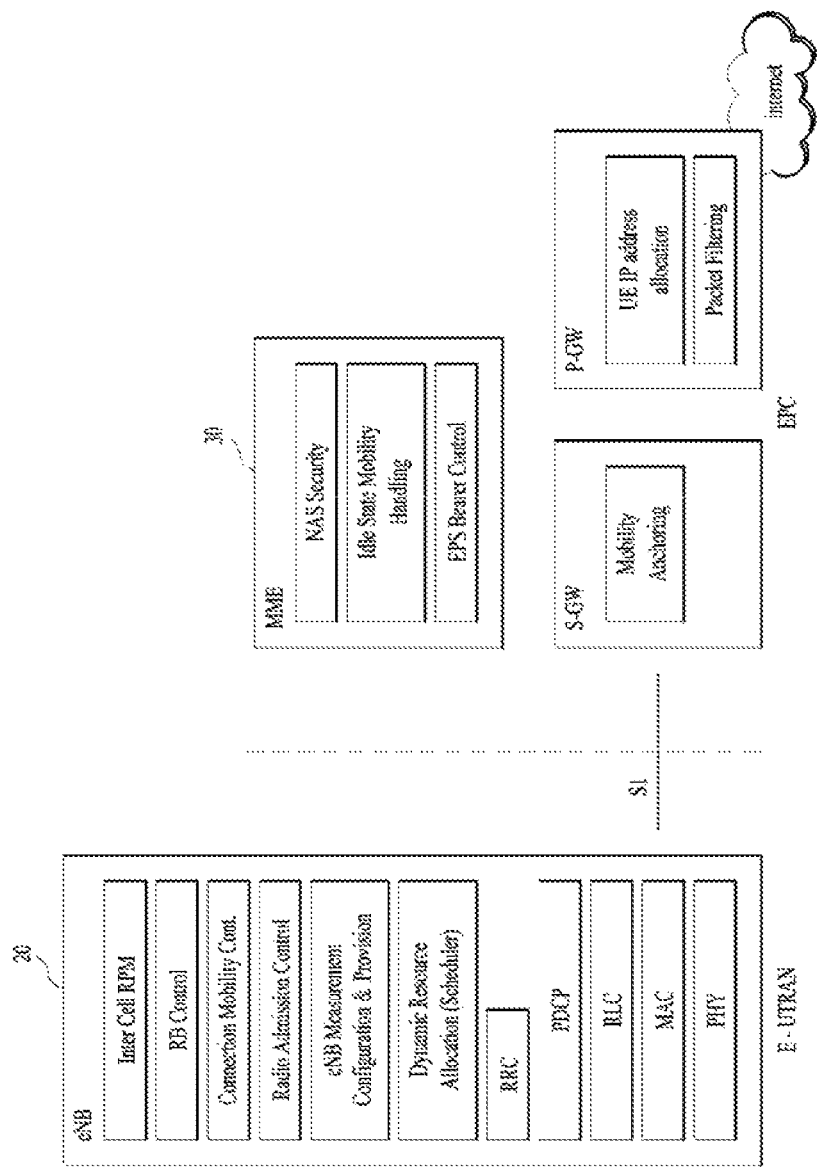
FIG. 2 is a block diagram depicting architecture of a typical E-UTRAN and a typical EPC.
Figure 3:
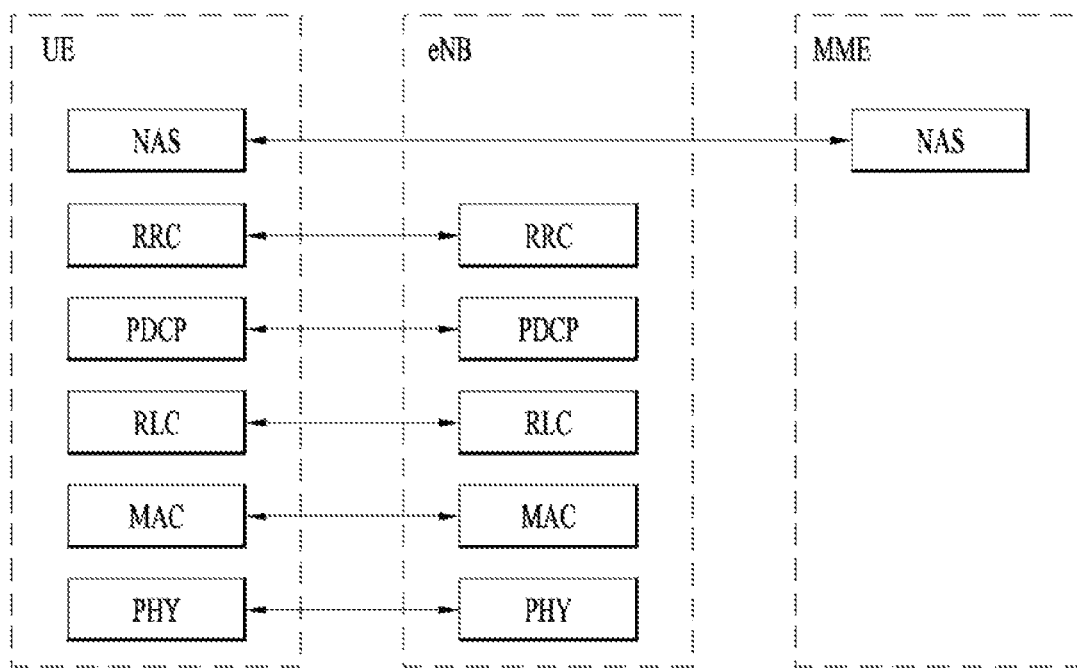
FIG. 3 is a diagram showing a control plane and a user plane of a radio interface protocol between a UE and an E-UTRAN based on a 3GPP radio access network standard.
Figure 3:
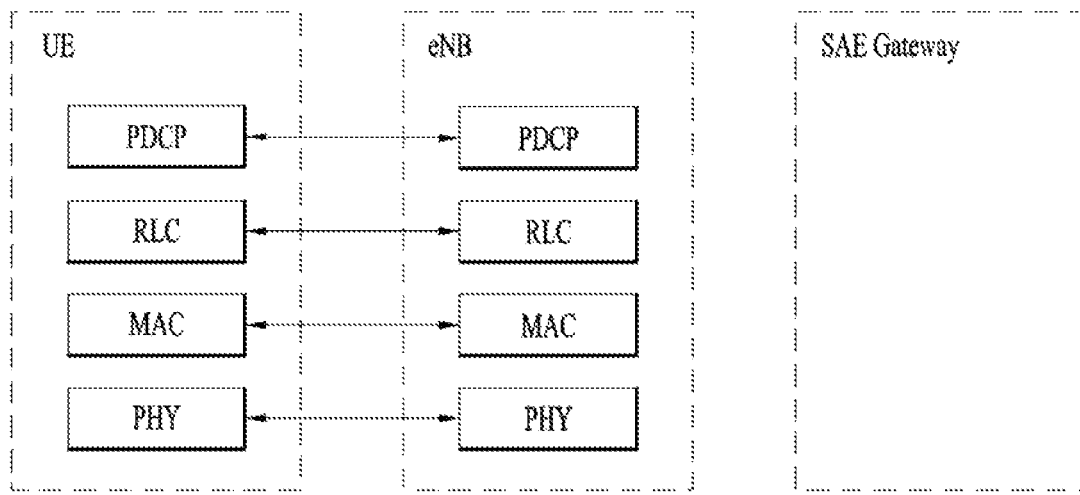
Figure 4:
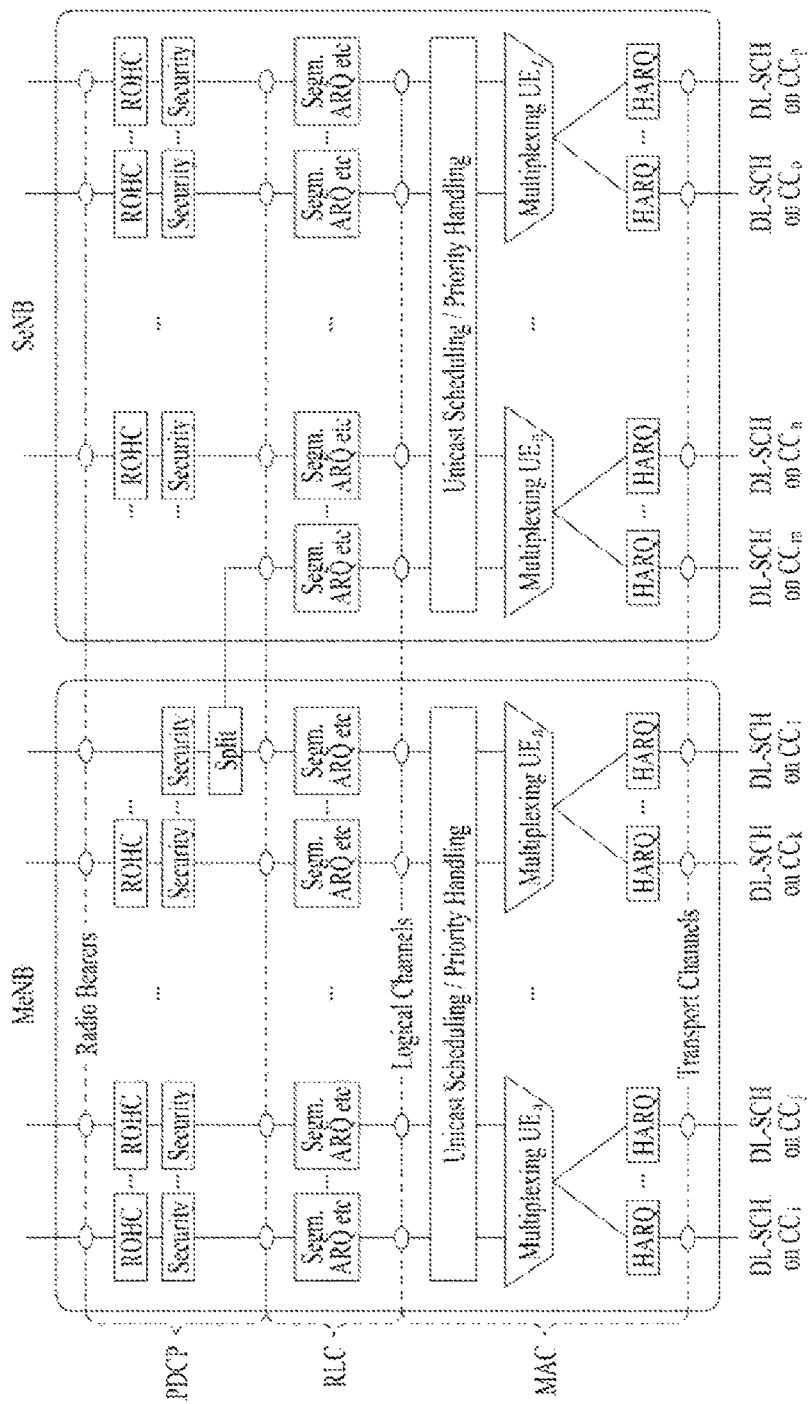
FIG. 4 is a diagram illustrating layer 2 structure for DL with CA and DC configured.

FIG. 4 is a diagram illustrating layer 2 structure for DL with CA and DC configured.

In case of dual connectivity (DC), the UE is configured with two MAC entities. The one MAC entity of two MAC entities is for MeNB and other MAC entity of two MAC entities is for SeNB. FIG. 4 describes the layer 2 structure for the downlink when both CA and DC are configured. In order to simplify the figure, the BCH, PCH, MCH and corresponding logical channels are not included. Also, only UEn is shown as having DC configured.

Figure 5:
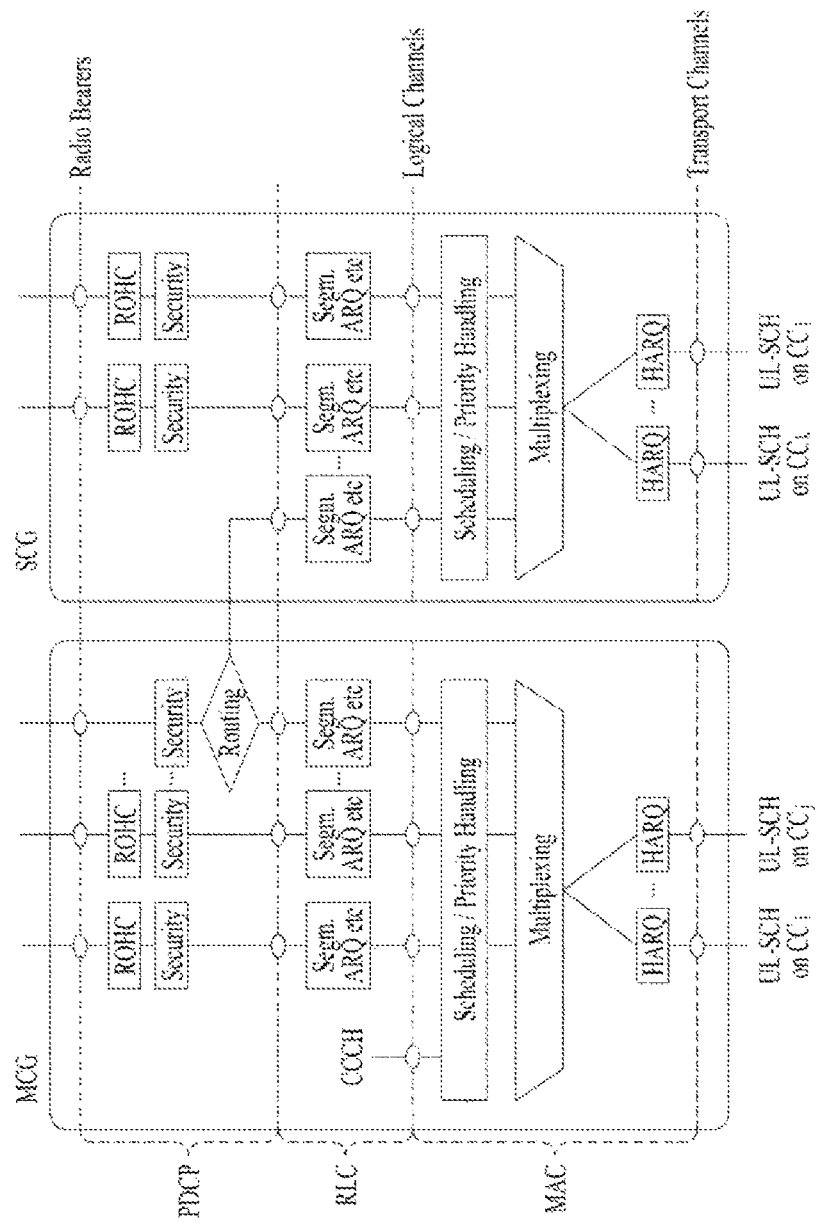
FIG. 5 is a diagram illustrating Layer 2 Structure for UL with CA and DC configured

FIG. 5 is a diagram illustrating Layer 2 Structure for UL with CA and DC configured FIG. 5 describes the layer 2 structure for the uplink when both CA and DC are configured. SRBs are always handled by the MeNB and as a result, CCCH is only shown for the MeNB. For a split bearer, UE is configured over which link (or both) the UE transmits UL PDCP PDUs by the MeNB. On the link which is not responsible for UL PDCP PDUs transmission, the RLC layer only transmits corresponding ARQ feedback for the downlink data.

Buffer Status Reporting (BSR)

Description related to buffer status reporting of 3GPP LTE/LTE-A standard document is as following.

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG (Logical Channel Group).

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

For Regular BSR:
if the BSR is triggered due to data becoming available for transmission for a logical channel for which logical-ChannelSR-ProhibitTimer is configured by upper layers:
start or restart the logicalChannelSR-ProhibitTimer;
else:
if running, stop the logicalChannelSR-ProhibitTimer.

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has data available for transmission in the TTI where the BSR is transmitted: report Truncated BSR of the LCG with the highest priority logical channel with data available for transmission;
else report Short BSR.
else if the number of padding bits is equal to or larger than the size of the Long BSR plus its subheader, report Long BSR.

For NB-IoT:
if rai-Activation is configured, and a buffer size of zero bytes has been triggered for the BSR, and the UE may have more data to send or receive in the near future (FFS):
cancel any pending BSR.

If the Buffer Status reporting procedure determines that at least one BSR has been triggered and not cancelled:
if the MAC entity has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered and logicalChannelSR-ProhibitTimer is not running:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR, except for NB-IoT. A Padding BSR is triggered for a specific MAC PDU only and the trigger is cancelled when this MAC PDU has been built.

Buffer Status Report MAC Control Elements

FIG. 6 is a diagram illustrating a short BSR and Truncated BSR MAC control element, FIG. 7 is a diagram illustrating a long BSR and Truncated BSR MAC control element.

Buffer Status Report (BSR) MAC control elements consist of either:
Short BSR and Truncated BSR format: one LCG ID field and one corresponding Buffer Size field (as shown in the FIG. 6); or
Long BSR format: four Buffer Size fields, corresponding to LCG IDs #0 through #3 (as shown in the FIG. 6).

The fields LCG ID and Buffer Size are defined as follow.

The Table 1 illustrates a buffer size levels for BSR.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |

TABLE 1-continued

| Index | Buffer Size (BS) value [bytes] |
|---|---|
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

The Table 2 illustrates extended Buffer size levels for BSR.

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |

TABLE 2-continued

| Index | Buffer Size (BS) value [bytes] |
|---|---|
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

LCG ID: The Logical Channel Group ID (LCG ID) field of the FIG. 4 identifies the group of logical channel(s) which buffer status is being reported. The length of the field is 2 bits. For NB-IoT, the LCG ID is set to #0.

Buffer Size: The Buffer Size field identifies of the FIG. 4 the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified. The size of the RLC and MAC headers are not considered in the buffer size computation. The length of this field is 6 bits. If extendedBSR-Sizes is not configured, the values taken by the Buffer Size field are shown in the Table 1. If extendedBSR-Sizes is configured, the values taken by the Buffer Size field are shown in the Table 2.

The BSR formats are identified by MAC PDU subheaders with LCIDs as specified in the Table 2.

PDCP Entities

The PDCP entities are located in the PDCP sublayer. Several PDCP entities may be defined for a UE. Each PDCP entity carrying user plane data may be configured to use header compression.

Each PDCP entity is carrying the data of one radio bearer. In this version of the specification, only the robust header compression protocol (ROHC), is supported. Every PDCP entity uses at most one ROHC compressor instance and at most one ROHC decompressor instance.

A PDCP entity is associated either to the control plane or the user plane depending on which radio bearer it is carrying data for.

Figure 8:
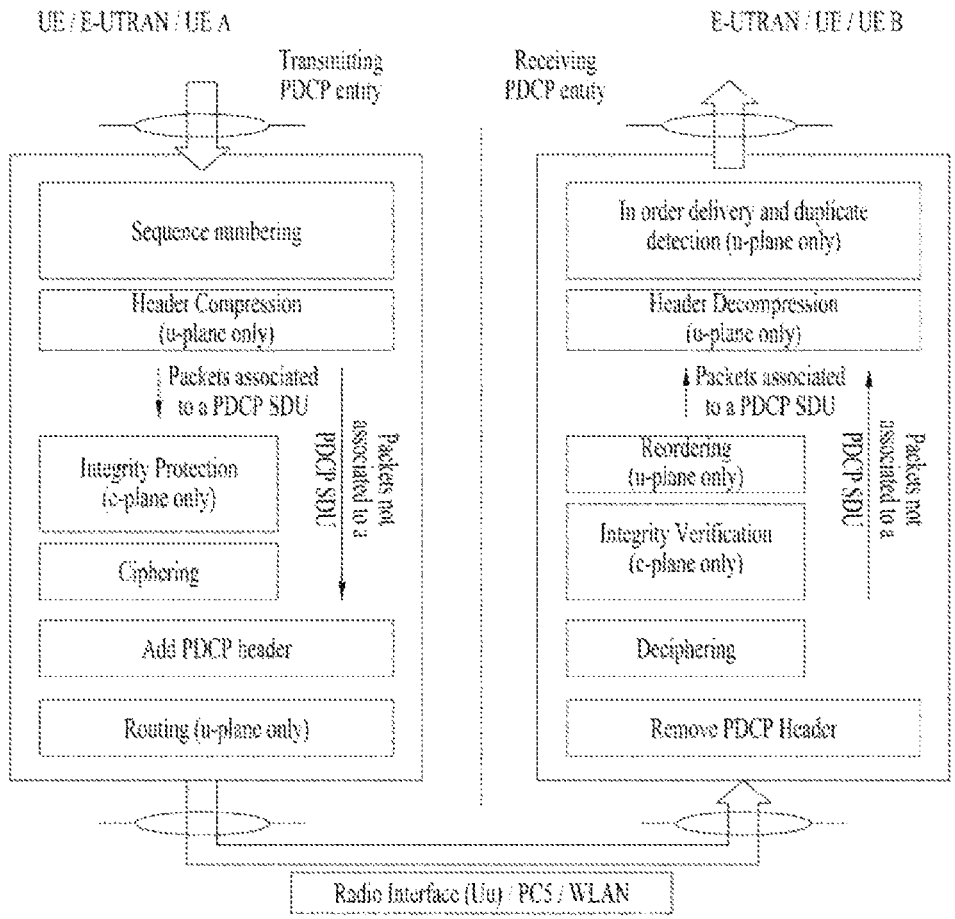
FIG. 8 represents the functional view of the PDCP entity for the PDCP sublayer.

FIG. 8 represents the functional view of the PDCP entity for the PDCP sublayer.

It should not restrict implementation. The FIG. 8 is based on the radio interface protocol architecture.

For RNs, integrity protection and verification are also performed for the u-plane.

For split and LWA bearers, routing is performed in the transmitting PDCP entity, and reordering is performed in the receiving PDCP entity.

For split bearers, when requested by lower layers to submit PDCP PDUs, the transmitting PDCP entity shall:
  if ul-DataSplitThreshold is configured and the data available for transmission is larger than or equal to ul-DataSplitThreshold:
    submit the PDCP PDUs to either the associated AM RLC entity configured for SCG or the associated AM RLC entity configured for MCG, whichever the PDUs were requested by;
  else:
    if ul-DataSplitDRB-ViaSCG is set to TRUE by upper layers [3]:
    if the PDUs were requested by the associated lower layers configured for SCG:
    submit the PDCP PDUs to the associated AM RLC entity configured for SCG;
    else:
    if the PDUs were requested by the associated lower layers configured for MCG:
    submit the PDCP PDUs to the associated AM RLC entity configured for MCG.

For LWA bearers, when submitting PDCP PDUs to lower layers, the transmitting PDCP entity shall:
  if ul-LWA-DataSplitThreshold is configured and the data available for transmission is larger than or equal to ul-LWA-DataSplitThreshold:
    submit the PDCP PDUs to either the associated AM RLC entity upon request from lower layers or the associated LWAAP entity;
  else:
    if ul-LWA-DRB-ViaWLAN is set to TRUE by upper layers [3]:
    submit the PDCP PDUs to the associated LWAAP entity;
    else:
    submit the PDCP PDUs to the associated AM RLC entity upon request from lower layers.

NOTE: The selection of PDCP PDUs submitted to the associated LWAAP entity are left up to the UE implementation.

Data Available for Transmission

Description related to data available for transmission of 3GPP LTE/LTE-A standard document is as following.

For the purpose of MAC buffer status reporting, the UE shall consider PDCP Control PDUs, as well as the following as data available for transmission in the PDCP layer:
  For SDUs for which no PDU has been submitted to lower layers:
    the SDU itself, if the SDU has not yet been processed by PDCP, or
    the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer.

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
  the SDU, if it has not yet been processed by PDCP, or
  the PDU once it has been processed by PDCP.

For radio bearers that are mapped on RLC AM, if the PDCP entity has previously performed the data recovery procedure, the UE shall also consider as data available for transmission in the PDCP layer, all the PDCP PDUs that have only been submitted to re-established AM RLC entity prior to the PDCP data recovery, starting from the first PDCP PDU whose successful delivery has not been confirmed by lower layers, except the PDUs which are indicated as successfully delivered by the PDCP status report, if received.

For split bearers, when indicating the data available for transmission to a MAC entity for BSR triggering and Buffer Size calculation, the UE shall:
  if ul-DataSplitThreshold is configured and the data available for transmission is larger than or equal to ul-DataSplitThreshold:
    indicate the data available for transmission to both the MAC entity configured for SCG and the MAC entity configured for MCG;
  else:
    if ul-DataSplitDRB-ViaSCG is set to TRUE by upper layer [3]:
    indicate the data available for transmission to the MAC entity configured for SCG only;
    if ul-DataSplitThreshold is configured, indicate the data available for transmission as 0 to the MAC entity configured for MCG;
    else:
    indicate the data available for transmission to the MAC entity configured for MCG only;
    if ul-DataSplitThreshold is configured, indicate the data available for transmission as 0 to the MAC entity configured for SCG.

For uplink LWA bearers, when indicating the data available for transmission to the MAC entity for BSR triggering and Buffer Size calculation, the UE shall:
  if ul-LWA-DataSplitThreshold is configured and the data available for transmission is larger than or equal to ul-LWA-DataSplitThreshold:
    indicate the data available for transmission to the MAC entity;
  else:
    if ul-LWA-DRB-ViaWLAN is set to TRUE by upper layers [3]:
    indicate the data available for transmission as 0 to the MAC entity;
    else:
    indicate the data available for transmission to the MAC entity.

NOTE: For LWA bearers, only the data that may be sent over LTE (i.e., excluding UL data already sent or decided to be sent over WLAN) is considered as "data available for transmission".

Figure 9:
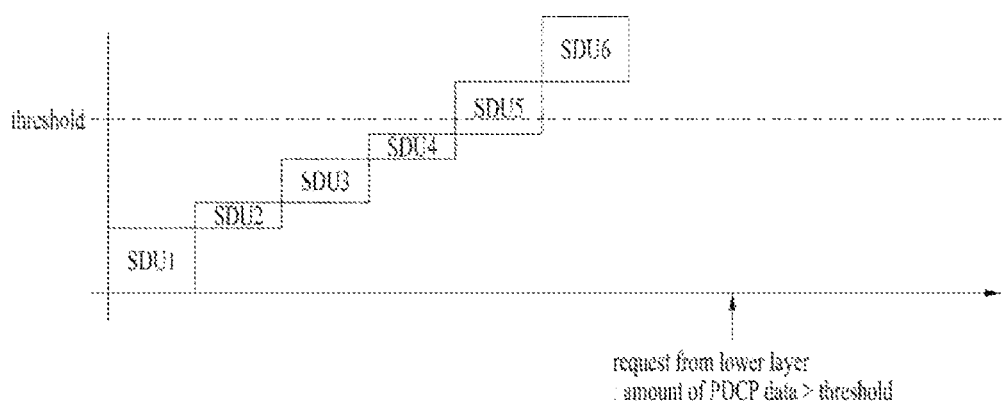
FIG. 9 is a diagram illustrating a LTE threshold based approach for uplink split bearer.

FIG. 9 is a diagram illustrating a LTE threshold based approach for uplink split bearer.

In LTE DC, for uplink split bearer, a threshold based approach is used in uplink data transmission and buffer status reporting. The UE may be configured with a threshold (ul-DataSplitThreshold), and PDCP entity compares the amount of data available for transmission in PDCP with the threshold. The Threshold (ul-DataSplitThreshold) indicates the threshold value for uplink data split operation specified in 3GPP TS 36.323 document, value b100 means 100 Bytes, b200 means 200 Bytes and so on. E-UTRAN only configures this field for split DRBs. For PDCP PDU submission to lower layer, PDCP entity performs comparison when PDCP entity is requested to submit PDCP PDUs from lower layers. If amount of PDCP data exceeds the threshold, PDCP entity submits the PDCP PDU to either RLC entity for mater cell group (MCG) or secondary cell group (SCG). Otherwise if amount of PDCP data doesn't exceed the threshold, PDCP entity submits the PDCP PDU to one RLC entity which is configured by the eNB (ul-DataSplitDRB-ViaSCG). The "ul-DataSplitDRB-ViaSCG" parameter indicates whether the UE shall send PDCP PDUs via SCG as specified in 3GPP TS 36.323 document. E-UTRAN only configures the field (i.e. indicates value TRUE) for split DRBs.

Figure 10:
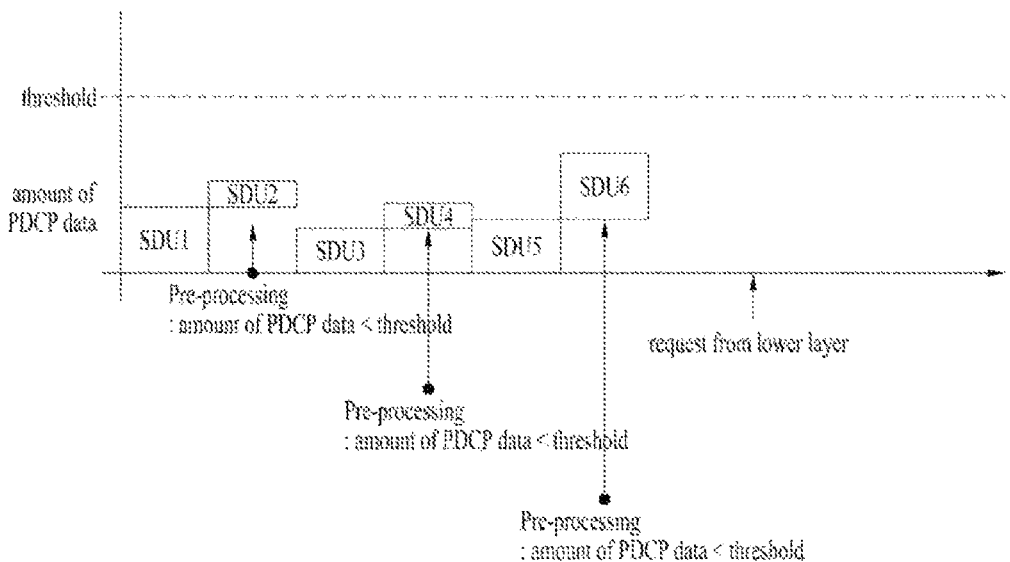
FIG. 10 is a diagram illustrating example of pre-processing with threshold based approach.

FIG. 10 is a diagram illustrating example of pre-processing with threshold based approach.

In NR, pre-processing is an important key to consider when designing a Layer 2 protocol. Thus, RLC concatenation is removed and RLC delivers out-of sequence RLC SDU to upper layer. However, for split bearer, LTE threshold based approach may prevent use of two uplink paths when pre-processing is performed in PDCP (entity). In case of pre-processing, LTE threshold based approach would mean that PDCP entity compares the amount of PDCP data to the threshold when PDCP entity performs pre-processing even before PDCP entity is requested to deliver PDCP PDUs. If PDCP entity performs pre-processing frequently, e.g., for every PDCP SDU reception, the amount of PDCP data is not likely to exceed the threshold. Accordingly, PDCP entity would submit the PDCP SDU always to one path. In order to allow use both data paths (or paths) of split bearer in pre-processing, a new threshold based approach is required.

In the present invention, for a PDCP of a split bearer, in order to decide a leg (variously called as data path, path, etc.) to which PDCP entity delivers a PDCP Data, the PDCP entity calculates a PDCP data Increment Rate in PDCP (PDCP_INC_RATE) for a period of time. When PDCP delivers PDCP data to lower layer, the PDCP entity compares the lastly calculated PDCP_INC_RATE to a (pre-defined) threshold, wherein the UE is provided with information related to the threshold and the period of time from a network (e.g., gNode B). If lastly calculated PDCP_INC_RATE is equal to or larger than the threshold, the PDCP entity delivers PDCP data to any of the legs of the split bearer. In other words, PDCP entity delivers PDCP data to either first leg or second leg of the split bearer. Else if lastly calculated PDCP_INC_RATE is smaller than the threshold, the PDCP entity delivers PDCP data to one specific leg of the split bearer.

For the split bearer, there is one PDCP and two RLC entities. In the present invention, each RLC entity and associated MAC entity are called as a leg of the split bearer.

The PDCP data Increment Rate in PDCP (PDCP_INC_RATE) is calculated as one of the followings:

Option 1. Amount of PDCP SDUs received from upper layer for a given period of time Option 2. Average amount of PDCP SDUs received from upper layer (for a given period of time)

Option 3. Number of PDCP SDUs received from upper layer for a given period of time Option 4. Average number of PDCP SDUs received from upper layer (for a given period of time).

Option 5. Data volume (amount) of PDCP SDUs arrived in the PDCP entity for a given period of time In Option 1 and Option 3, the given period of time is either configured by the network or pre-determined in the specification. In Option 2 and Option 4, the PDCP entity of the UE calculates average amount/number of PDCP SDUs by dividing the amount/number of PDCP SDUs received from upper layer by the given period of time, or calculates the average amount/number of PDCP SDUs by setting the given period of time for calculation of the average by itself.

In the option 1 and option 3, the PDCP entity may count the given period of time from a time point when the PDCP entity receives a PDCP SDU is from upper layer. The PDCP SDU is the first PDCP SDU that the PDCP entity receives after the PDCP entity is configured for split-bearer. When the previous period of time ends, the PDCP entity starts to count the next period of time from a time point.

Option 1: Amount of PDCP SDUs Received from Upper Layer for a Given Period of Time During the given period of time, the PDCP entity may calculate amount of PDCP SDUs by aggregating or summing up the size of PDCP SDUs received from upper layers during the given period of time. At the end of the given period of time, the PDCP entity may compare the amount of PDCP SDUs to the threshold. If the amount of PDCP SDUs is equal to or larger than the threshold, for BSR operation in MAC, the PDCP entity indicates the amount of PDCP SDUs to the MAC entities associated with all legs of the split bearer. If the amount of PDCP SDUs is less than the threshold, for BSR operation in MAC, the PDCP entity indicates the amount of PDCP SDUs to the MAC entity associated with one specific leg of the split bearer.

For a MAC PDU generation in MAC, if the amount of PDCP SDUs for the given period of time is equal to or larger than the threshold, where the given period of time is the last period of time before the MAC PDU generation, the PDCP entity may deliver a PDCP SDU to the MAC entity associated with any leg of the split bearer. If the amount of PDCP SDUs for the given period of time is less than the threshold, where the period of time is the last period of time before the MAC PDU generation, the PDCP entity may deliver a PDCP SDU to the MAC entity associated with one specific leg of the split bearer.

Option 2: Average Amount of PDCP SDUs Received from Upper Layer (for a Given Period of Time)

During the given period of time, the PDCP entity may calculate amount of PDCP SDUs by aggregating or summing up the size of PDCP SDUs received from upper layers during the given period of time. At the end of the given period of time, the PDCP entity of the UE may calculate the average of the amount of PDCP SDUs by dividing the amount of PDCP SDUs by the period of time, and compare the average of the amount of PDCP SDUs to the threshold. If the average amount of PDCP SDUs is equal to or larger than the threshold, for BSR operation in MAC, the PDCP entity indicates the amount of PDCP SDUs to the MAC entities associated with all legs of the split bearer. If the average amount of PDCP SDUs is less than the threshold, for BSR operation in MAC, the PDCP entity indicates the amount of PDCP SDUs to the MAC entity associated with one specific leg of the split bearer.

For a MAC PDU generation in MAC, if the average amount of PDCP SDUs for a period of time is equal to or larger than the threshold, where the given period of time is the last period of time before the MAC PDU generation, the PDCP entity may deliver a PDCP SDU to the MAC entity associated with any leg of the split bearer. If the average amount of PDCP SDUs for the given period of time is less than the threshold, where the period of time is the last period of time before the MAC PDU generation, the PDCP entity may deliver a PDCP SDU to the MAC entity associated with one specific leg of the split bearer.

Option 3: Number of PDCP SDUs Received from Upper Layer for a Given Period of Time During the given period of time, the PDCP entity may calculate the number of PDCP SDUs by aggregating or summing up the number of PDCP SDUs received from upper layers during the given period of time. At the end of the given period of time, the PDCP entity may compare the number of PDCP SDUs to the threshold. If the number of PDCP SDUs is equal to or larger than the threshold, for BSR operation in MAC, the PDCP entity indicate the amount of PDCP SDUs to the MAC entities associated with all legs of the split bearer. If the number of PDCP SDUs is less than the threshold, for BSR operation in MAC, the PDCP entity indicates the amount of PDCP SDUs to the MAC entity associated with one specific leg of the split bearer.

For a MAC PDU generation in MAC, if the number of PDCP SDUs for a given period of time is equal to or larger than the threshold, where the given period of time is the last period of time before the MAC PDU generation, the PDCP may deliver a PDCP SDU to the MAC entity associated with any leg of the split bearer. If the number of PDCP SDUs for the given period of time is less than the threshold, where the given period of time is the last period of time before the MAC PDU generation, the PDCP entity may deliver a PDCP SDU to the MAC entity associated with one specific leg of the split bearer.

Option 4: Average Number of PDCP SDUs Received from Upper Layer (for a Given Period of Time)

During the given period of time, the PDCP entity may calculate the number of PDCP SDUs by aggregating or summing up the number of PDCP SDUs received from upper layers during the given period of time. At the end of the given period of time, the PDCP entity may calculate the average of the number of PDCP SDUs by dividing the number of PDCP SDUs by the period of time, and compares the average of the number of PDCP SDUs to the threshold. If the average number of PDCP SDUs is equal to or larger than the threshold, for BSR operation in MAC, the PDCP entity indicates the amount of PDCP SDUs to the MAC entity associated with any leg of the split bearer. If the average number of PDCP SDUs is less than the threshold, for BSR operation in MAC, the PDCP entity indicates the amount of PDCP SDUs to the MAC entity associated with one specific leg of the split bearer.

For a MAC PDU generation in MAC, if the average number of PDCP SDUs for a period of time is equal to or larger than the threshold, where the period of time is the last period of time before the MAC PDU generation, the PDCP entity may deliver a PDCP SDU to the MAC entity associated with any leg of the split bearer. If the average number of PDCP SDUs for a period of time is less than the threshold, where the period of time is the last period of time before the MAC PDU generation, the PDCP entity may deliver a PDCP SDU to the MAC entity associated with one specific leg of the split bearer.

Figure 11:
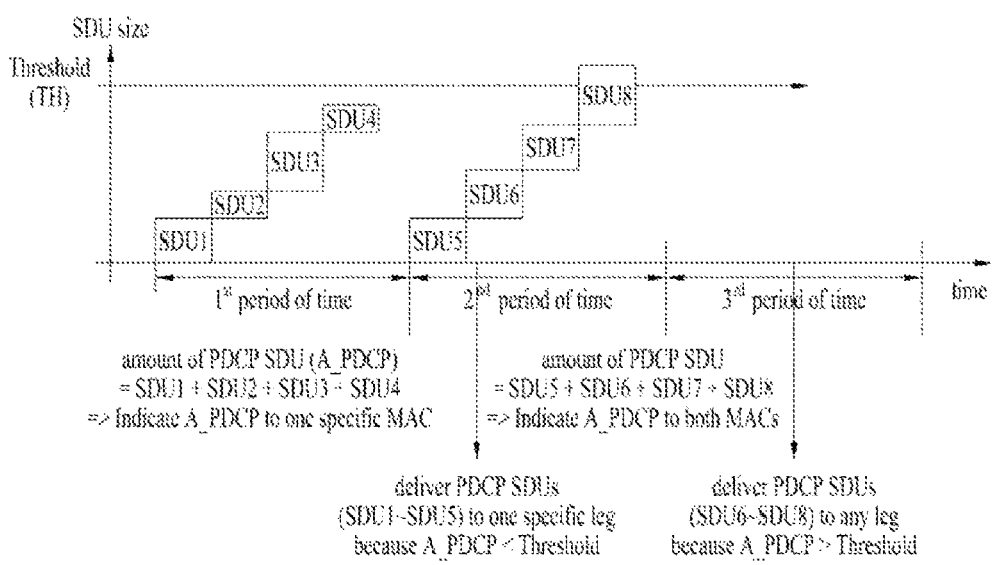
FIG. 11 is a diagram illustrating example of threshold based uplink split operation for pre-processing in PDCP entity.

FIG. 11 is a diagram illustrating example of threshold based uplink split operation for pre-processing in PDCP entity.

The PDCP entity may be configured with a (predefined) threshold for a split bearer. The PDCP entity may be configured to use leg1 of the split bearer if amount of PDCP SDU (A_PDCP) is less than the threshold. The PDCP entity starts to sum the amount of PDCP SDUs received from the upper layer for the 1st period of time. At the end of the 1st period of time, the UE entity may compare the A_PDCP and the threshold. If A_PDCP=size of SDU1+SDU2+SDU3+SDU4 is less than the threshold, the PDCP entity indicates A_PDCP to the MAC entity associated with Leg1 of the split bearer and indicates zero (A_PDCP=0) to the other MAC entities.

The PDCP starts to sum the amount of PDCP SDUs received from the upper layer for the 2nd period of time. During the 2nd period of time, the UE delivers PDCP PDUs associated with the PDCP SDU1~SDU5 (SDU1+SDU2+SDU3+SDU4+SDU5) to the RLC entity associated with leg1 of the split bearer because A_PDCP of the 1st period of time is less than the threshold.

At the end of the 2nd period of time, the UE may compare the A_PDCP and the threshold. If A_PDCP=size of PDCP SDU5~SDU8 (SDU5+SDU6+SDU7+SDU8) is less than the threshold, the PDCP entity indicates A_PDCP to the MAC entities associated with specific leg (e.g., one specific leg of all legs) of the split bearer. The PDCP entity starts to sum the amount of PDCP SDUs received from the upper layer for the 3rd period of time. During the 3rd period of time, the UE may deliver PDCP PDUs associated with the PDCP SDU6~SDU8 to any RLC entity associated with any leg of the split bearer because A_PDCP of the 2nd period of time is larger than the threshold.

Option 5: Amount of PDCP SDUs Arrived in the PDCP Entity for a Given Period of Time In LTE dual connectivity (DC), for UL split bearer, the PDCP entity is configured with a threshold (ul-DataSplit-Threshold) in unit of bytes. The PDCP entity compares the PDCP data volume to the threshold when the PDCP entity is requested from lower layers to submit the PDCP PDUs. If the data volume exceeds the threshold, the PDCP entity uses both data paths, i.e., the PDCP entity submits PDCP PDUs to either data path. As all PDCP SDUs arrived in the PDCP entity are stored in the PDCP entity unless the PDCP is requested to submit PDCP PDUs to lower layer, high PDCP data arrival rate is translated into large PDCP data volume. That is, if PDCP data arrival rate is high, the data volume will exceed the threshold and the PDCP entity will submit the PDCP PDUs through any one of data paths of the split bearer.

In NR, however, a bit different situation with fast scheduling and pre-processing may occur.

With fast scheduling, the PDCP entity will submit the PDCP PDUs to lower layers more often, and the PDCP data volume would quickly decrease, e.g., probably under the threshold.

With pre-processing of the PDCP SDUs, the PDCP entity will submit the PDCP PDUs to lower layers even before request from the lower layers. Although we may assume that the PDCP wouldn't pre-process so often, it is totally up to UE implementation how often or how much data would be pre-processed. If the PDCP entity considers that lots of the PDCP SDUs are currently arriving in the PDCP entity, the PDCP entity will perform pre-processing. It would result in rapid decrease of the PDCP data volume, e.g., probably under the threshold.

As a consequence, the PDCP entity may use only one path of the split bearer even though there are still lots of the PDCP SDUs arrived in the PDCP entity.

Figure 12:
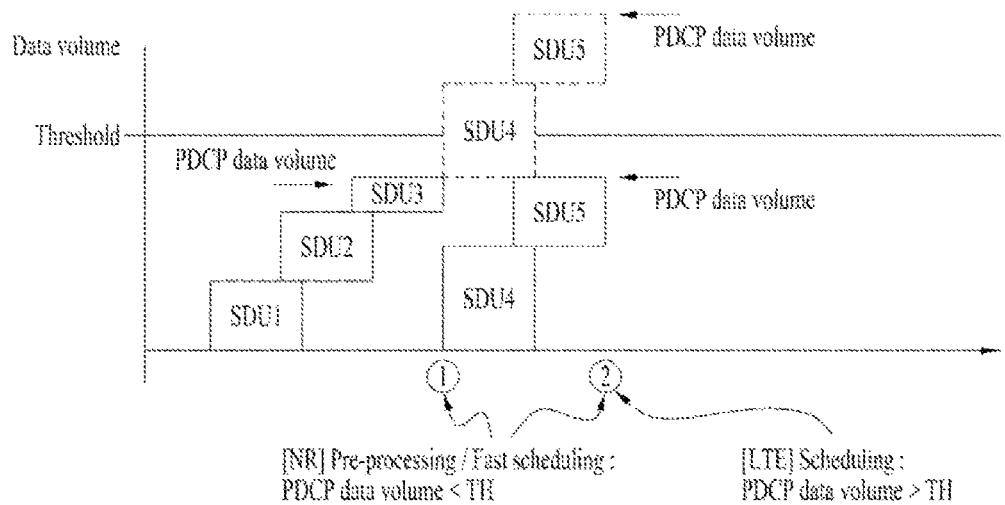
FIG. 12 is a diagram illustrating PDCP PDU submission by comparing the PDCP data volume and the threshold (LTE system vs. NR system).

FIG. 12 is a diagram illustrating PDCP PDU submission by comparing the PDCP data volume and the threshold (LTE system vs. NR system).

FIG. 12 depicts an example of PDCP PDU submission in LTE system and NR system.

In LTE system, assume that the PDCP entity submits the PDCP PDUs at time point 2 (②) due to request from lower layers but not at time point 1 (①). In this case, the PDCP SDUs 1, 2, 3, 4, and 5 are all stored in the PDCP, and thus, the PDCP data volume exceeds the threshold. Therefore, the PDCP entity will submit PDCP PDUs through one data path of the split bearer. Now in NR, assume that PDCP entity submits the PDCP PDUs at time point 1 as well as at time point 2 (red). At time point 1, the PDCP SDUs 1, 2, and 3 are stored in the PDCP entity, and thus, the PDCP data volume is less than the threshold. Accordingly, the PDCP entity will use only one specific data path of the split bearer. At time point 2, the PDCP SDUs 4 and 5 are stored in the PDCP entity, and thus, the PDCP data volume is again less than the threshold. Consequently, the PDCP entity will again submits PDCP PDUs through only one specific data path of the split bearer.

As seen in the example, in NR, it could happen that lots of PDCP SDUs are arriving in the PDCP entity, i.e., high PDCP data arrival rate, but they can be quickly submitted to the lower layers. Then, PDCP data volume will be kept small. In this case, comparing PDCP data volume to the threshold would lead to use only one data path of split bearer, which would be unintended split operation.

When lots of PDCP SDUs are arriving in the PDCP entity, comparing PDCP data volume to the threshold may lead to use only one data path of spilt bearer because PDCP data volume may be kept small, e.g., under the threshold, due to fast scheduling and pre-processing.

In designing split operation, two data path of split bearer are used if PDCP data arrival rate is high. In other words, if PDCP data arrival rate is larger than the threshold, PDCP entity submits PDCP PDUS to lower layer through either first data path or second data path of split bearer. In LTE system, it was achieved by using a PDCP data volume as a threshold. In NR system, however, PDCP data arrival rate is no longer translated into PDCP data volume. Therefore, more logical way would be to use PDCP data arrival rate as a threshold to determine whether to use only one path or two paths (i.e., one specific data path, or either first data path or second data path). In order to measure the PDCP data arrival rate, the PDCP entity needs to be configured with a time period over which the PDCP entity counts (or calculates) the amount of PDCP SDUs arrived in the PDCP entity, which may be sufficient to be configured per UE to control the averaging level.

When PDCP entity decides to submit the PDCP PDUs to lower layer due to e.g., pre-processing or request from lower layers, the PDCP entity counts the amount of the PDCP SDUs arrived in the PDCP entity within (or during) a given period of time, and compares the amount of the PDCP SDUs arrived in the PDCP entity to the threshold. If the amount of the PDCP SDUs arrived within the given period of time (or time window) exceeds the threshold, the PDCP entity uses either first data path or second data path for submitting PDCP PDUs to lower layer. Otherwise, the PDCP entity uses one specific data path. As the PDCP entity counts the amount of PDCP SDUs within the given period of time (or time window), there is no need of configuring the threshold in unit of rate, e.g., bytes/time unit, but PDCP entity simply compares the amount of PDCP SDUs which is counted within the given period of time (or time window) to the threshold.

Figure 13:
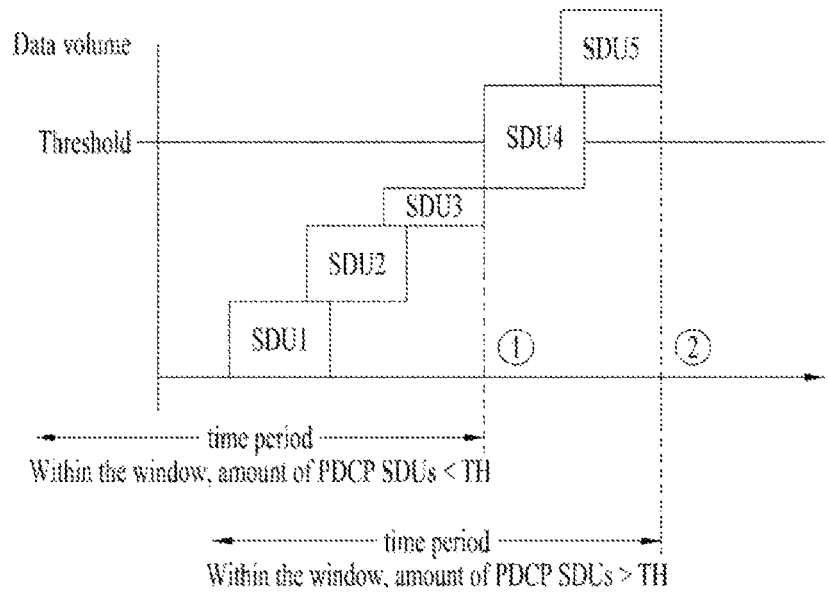
FIG. 13 is a diagram illustrating comparing the PDCP data arrival rate.

FIG. 13 is a diagram illustrating comparing the PDCP data arrival rate.

At time point 1, the PDCP entity counts amount of PDCP SDUs arrived within the given period of time (or time window), i.e., counts amount of SDU1+SDU2+SDU3. The amount of SDU1+SDU2+SDU3 doesn't exceed the threshold, the PDCP entity uses one specific data path for submitting PDCP PDUs to lower layer. At time point 2 (②), the PDCP entity counts the amount of PDCP SDUs arrived within the given period of time (or time window), i.e., counts amount of SDU1+SDU2+SDU3+SDU4+SDU5. The amount exceeds the threshold, the PDCP entity uses either first data path or second data path for submitting PDCP PDUs to lower layer.

By configuring the given period of time (or time window) in addition to the threshold, the PDCP entity can count the amount of PDCP SDUs within the given period of time (or time window), and compare the amount of PDCP SDUs within the given period of time (or time window) to the threshold. In this case, UE may receive information related to a length of the given period of time (or time window) from a network. The given period of time (or time window) is expressed as "time period" in the FIG. 13.

Thus, the PDCP entity may count the amount of SDU1+SDU2+SDU3 arrived in the PDCP entity during the time period (herein, time end point of the time period is time point 1 (①)). Further, the PDCP entity may count the amount of SDU1+SDU2+SDU3+SDU4+SDU5 arrived (herein, time end point of the time period is time point 2 (②)). With this way, the PDCP entity for split bearer can properly decide whether to use one specific data path or any one of two paths even in case when the lots of PDCP SDUs are arriving in the PDCP entity but PDCP data volume is small by submitting PDCP PDUs quickly to the lower layers.

As conclusion of the Option 5, the PDCP entity is configured with the time period over which the PDCP entity counts the amount of PDCP SDUs arrived in the PDCP entity. The time period (or length of time period) is configured per UE. When submitting PDCP PDUs to lower layers, the PDCP entity compares the amount of PDCP SDUs arrived in the PDCP entity within the time period to the threshold. If the amount exceeds the threshold, the PDCP entity uses either first data path or second data path of split bearer. Otherwise if the amount doesn't exceed the threshold, the PDCP entity uses only specific (configured) data path.

Figure 14:
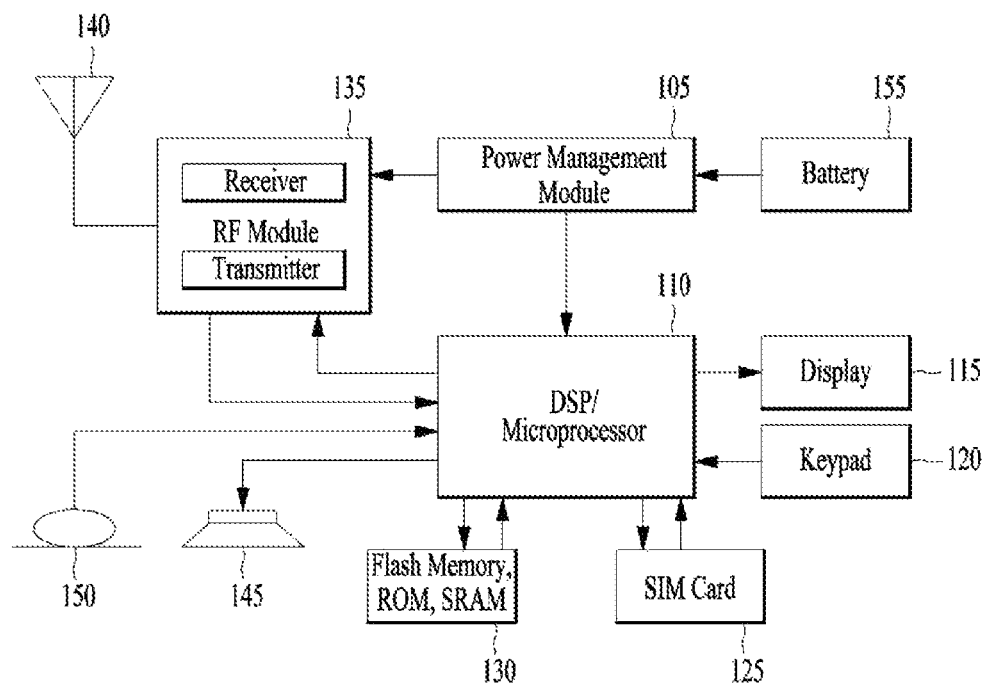
FIG. 14 is a block diagram of an apparatus (e.g., communication apparatus) according to an embodiment of the present invention.

FIG. 14 is a block diagram of an apparatus (e.g., communication apparatus) according to an embodiment of the present invention.

The apparatus shown in FIG. 14 can be a user equipment (UE) and/or eNB adapted to perform the above mechanism, but it can be any apparatus for performing the same operation.

As shown in FIG. 14, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 14 may represent a UE comprising a receiver (135) configured to receive signal from the network, and a transmitter (135) configured to transmit signals to the network. The receiver and transmitter can constitute the transceiver (135). The UE further comprises a processor (110) connected to the transceiver (135: receiver and transmitter).

Also, FIG. 14 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Apparatus and method for a user equipment (UE) operating a split bearer are applicable to a variety of wireless communication systems, e.g. IEEE system, in addition to the 3GPP system.

What is claimed is:

1. A method for a user equipment (UE) operating a split bearer in a wireless communication system, the method comprising:
    configuring a Packet Data Convergence Protocol (PDCP) entity and two Radio Link Control (RLC) entities associated with the split bearer;
    wherein a first RLC entity is configured as a first data path of the split bearer,
    wherein a second RLC entity is configured as a second data path of the split bearer,
    calculating an PDCP data increment rate;
    determining a data path of the split bearer based on the PDCP data increment rate and a predefined threshold value; and
    transmitting PDCP SDUs to a RLC entity associated with a specific data path of the split bearer based on the PDCP data increment rate being less than the predefined threshold value.

2. The method of claim 1, further comprising:
    based on the PDCP data increment rate being equal to or larger than the predefined threshold value, transmitting PDCP SDUs to a RLC entity associated with any data path of the split bearer based on the determining.

3. The method of claim 2, further comprising:
    indicating an amount of PDCP SDUs received from an upper layer for a given period of time to both a first MAC entity and a second MAC entity associated with the first data path and the second data path of the split bearer.

4. The method of claim 1, further comprising:
    indicating an amount of PDCP SDUs received from an upper layer for a given period of time to a specific MAC entity associated with the specific data path of the split bearer.

5. The method of claim 1, wherein the PDCP data increment rate is calculated as an amount of PDCP SDUs received from an upper layer for a given period of time.

6. The method of claim 5, wherein a length of the given period of time is configured for the UE,
    wherein the given period of time corresponds a duration between a second time point which the PDCP entity submits the PDU SDUs to a lower layer and a first time point before by the length of the given period of time from the second time point.

7. The method of claim 1, wherein the PDCP data increment rate is calculated as a number of PDCP SDUs received from an upper layer for a given period of time.

8. A user equipment (UE) operating a split bearer in a wireless communication system, the UE comprising:
    a transmitter; and
    a processor configured to:
    configure a Packet Data Convergence Protocol (PDCP) entity and two Radio Link Control (RLC) entities associated with the split bearer;
    wherein a first RLC entity is configured as a first data path of the split bearer,
    wherein a second RLC entity is configured as a second data path of the split bearer,
    calculate an PDCP data increment rate;

determine a data path of the split bearer based on the PDCP data increment rate and a predefined threshold value;

control the transmitter to transmit PDCP SDUs to a RLC entity associated with a specific data path of the split bearer based on the PDCP data increment rate being less than the predefined threshold value.

9. The UE of claim 8, further comprising:

a transmitter configured to transmit PDCP SDUs to a RLC entity associated with any data path of the split bearer based on the determining based on the PDCP data increment rate being equal to or larger than the predefined threshold value.

10. The UE of claim 9, wherein the processor is configured to indicate an amount of PDCP SDUs received from an upper layer for a given period of time to both a first MAC entity and a second MAC entity associated with the first data path and the second data path of the split bearer.

11. The UE of claim 8, wherein the processor is configured to indicate an amount of PDCP SDUs received from an upper layer for a given period of time to a specific MAC entity associated with the specific data path of the split bearer.

12. The UE of claim 8, wherein the processor is configured to calculate PDCP data increment rate as an amount of PDCP SDUs received from an upper layer for a given period of time.

13. The UE of claim 8, wherein the processor is configured to calculate the PDCP data increment rate as a number of PDCP SDUs received from an upper layer for a given period of time.

* * * * *